(12) United States Patent
Stoll et al.

(10) Patent No.: US 7,725,688 B1
(45) Date of Patent: May 25, 2010

(54) SYSTEM AND METHOD FOR STORING STATES USED TO CONFIGURE A PROCESSING PIPELINE IN A GRAPHICS PROCESSING UNIT

(75) Inventors: Robert J. Stoll, Los Altos, CA (US); Daniel P. Wilde, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 69 days.

(21) Appl. No.: 11/470,013

(22) Filed: Sep. 5, 2006

(51) Int. Cl.
*G06F 9/00* (2006.01)
*G06T 1/20* (2006.01)

(52) U.S. Cl. ..................... 712/220; 345/506
(58) Field of Classification Search ............ 712/15, 712/43, 220, 229; 345/418, 501, 506
See application file for complete search history.

(56) References Cited

U.S. PATENT DOCUMENTS

| | | | | |
|---|---|---|---|---|
| 4,893,233 A * | 1/1990 | Denman et al. | ............. | 712/244 |
| 5,805,875 A * | 9/1998 | Asanovic | .................. | 712/222 |
| 6,462,743 B1 * | 10/2002 | Battle | ..................... | 345/506 |
| 6,947,053 B2 * | 9/2005 | Malka et al. | ................ | 345/582 |
| 7,028,197 B2 * | 4/2006 | Subramanian et al. | ...... | 713/310 |
| 7,383,426 B2 * | 6/2008 | Chung et al. | ................ | 712/220 |
| 2002/0056034 A1 * | 5/2002 | Gearty et al. | ................. | 712/23 |
| 2008/0016321 A1 * | 1/2008 | Pennock et al. | .............. | 712/35 |

* cited by examiner

*Primary Examiner*—David J Huisman
(74) *Attorney, Agent, or Firm*—Patterson & Sheridan, LLP

(57) ABSTRACT

States that are used in configuring a processing pipeline are passed down through a separate pipeline in parallel with the data transmitted down through the processing pipeline. With this separate pipeline, the states for configuring any one stage of the processing pipeline are continuously available in the corresponding stage of the state pipeline, and new states for configuring the processing pipeline can be transmitted down the state pipeline without flushing the processing pipeline. The processing pipeline and the separate pipeline for the states can be divided into multiple sections so that the width of the separate pipeline for the states can be reduced.

17 Claims, 5 Drawing Sheets

PRIOR ART

SYSTEM AND METHOD FOR STORING STATES USED TO CONFIGURE A PROCESSING PIPELINE IN A GRAPHICS PROCESSING UNIT

FIELD OF THE INVENTION

The present invention relates generally to graphics processing, and more specifically to pipelining the states that are used to configure a graphics processing pipeline.

BACKGROUND

Conventionally, a processing pipeline of a graphics processing unit is configured using states that are broadcast to the processing pipeline. FIG. 1 illustrates how a processing pipeline 130 is configured using states that are broadcast. A register 110 receives data 101 to be processed by the processing pipeline 130 along with a state command. The data to be processed are passed to the processing pipeline 130 and the state command is detected by a state decoder 120, which decodes it to generate states for configuring the processing pipeline 130. The states are then broadcast to the individual stages of the processing pipeline 130 and used to configure them.

When a change in the configuration of the processing pipeline 130 is desired, new states are broadcast by the state decoder 120 to the individual stages of the processing pipeline. However, before the configuration of the processing pipeline 130 can be changed, the processing pipeline 130 must finish processing all of the data it received from the register 110, i.e., the processing pipeline 130 needs to be flushed. The time taken to flush the processing pipeline 130 can be as long as the processing latency of the processing pipeline 130 and introduces unwanted delay, especially in the case of a very deep processing pipeline with many stages. As a result, configuration changes in such a processing pipeline are generally kept to a minimum.

SUMMARY OF THE INVENTION

The present invention provides an improved architecture for communicating states that are used in configuring a processing pipeline. According to embodiments of the present invention, states that are used in configuring a processing pipeline are also pipelined, i.e., transmitted down through a separate pipeline in parallel with the data transmitted down through the processing pipeline. With such an architecture, the states for configuring any one stage of the processing pipeline are continuously available in the corresponding stage of the state pipeline, and new states for configuring the processing pipeline can be transmitted down the state pipeline without flushing the processing pipeline.

According to a first embodiment of the present invention, a processing unit includes a processing pipeline for processing data and a state pipeline for carrying states that are used in configuring the processing pipeline. The state pipeline is configured with multiple data paths to carry a number of unique states down the multiple data paths. Each stage of the processing pipeline is configured based on one or more of the unique states that are carried in a corresponding stage of the state pipeline. The processing unit further includes a first memory unit for receiving and storing the data to be processed in the processing pipeline, a state command and a tag associated the data to be processed, a state decoder for decoding the state command into states, a second memory unit for storing the states, and a selector that selects states stored in the second memory unit based on the tag for transmission down the state pipeline.

According to a second embodiment of the invention, both the processing pipeline and the state pipeline in a processing unit are divided into at least two sections. The stages of any one section of the processing pipeline are configured using states that are carried in a corresponding section of the state pipeline. Each state pipeline section is configured with multiple data paths and the number of such data paths is less than the total number of unique states that are transmitted down the state pipeline.

The present invention also provides a method for configuring a processing pipeline using states that are transmitted through a state pipeline. The method, according to an embodiment of the present invention, includes the steps of transmitting graphics data through multiple stages of the processing pipeline, transmitting states through multiple stages of the state pipeline, and configuring each stage of the processing pipeline based on the states stored in a corresponding stage of the state pipeline.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the detailed description of present invention described below, the processing pipeline is a color raster operations pipeline (CROP), which is a part of the raster operations unit (ROP) of a graphics processing unit (GPU). The present invention is, however, not limited thereto, and may be practiced in combination with any processing pipeline of a graphics processing unit or a graphics processing pipeline of any processing unit.

Figure 1:
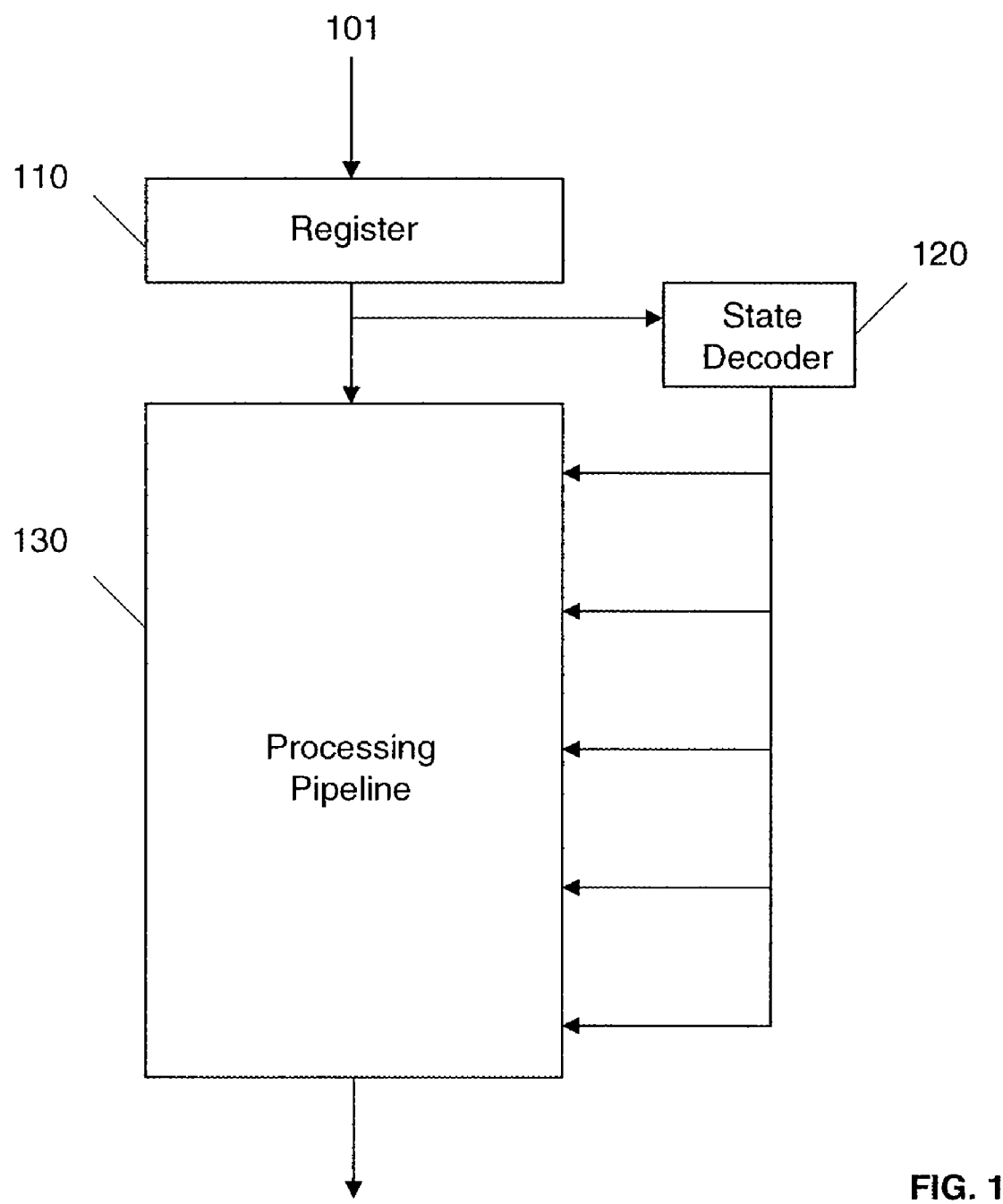
FIG. 1 is a block diagram of a processing unit having a processing pipeline configured with states that are broadcast.
Figure 2:
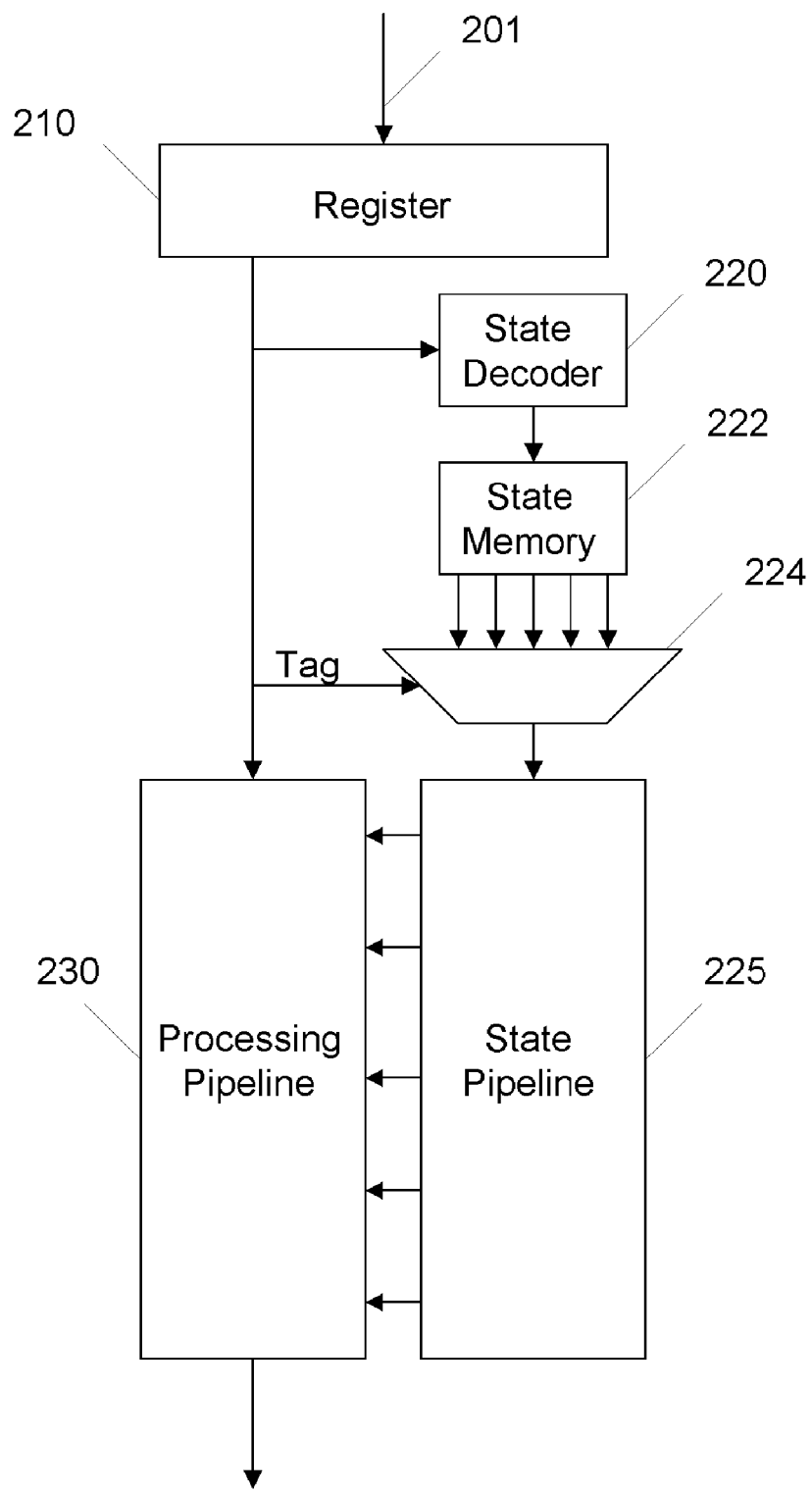
FIG. 2 is a block diagram of a processing unit having a processing pipeline and a state pipeline according to a first embodiment of the invention.

FIG. 2 is a block diagram of a processing unit having a processing pipeline 230 and a state pipeline 225 according to a first embodiment of the invention. The processing pipeline 230 receives data 201 through a register 210 and processes the data through multiple stages. Each stage of the processing pipeline 230 is configured based on states that are carried in a corresponding stage of the state pipeline 225. For example, stage 1 of the processing pipeline 230 is configured based on states that are carried in stage 1 of the state pipeline 225, and stage 2 of the processing pipeline 230 is configured based on states that are carried in stage 2 of the state pipeline 225, and so forth.

Along with data 201, a tag associated with the data and a state command are also received through the register 210. The state command is detected by a state decoder 220 which decodes it into states that are stored in a state memory 222. A selector 224 is used to select a set of states stored in the state memory 222 for transmission down the state pipeline 225. The selection is made in accordance with the tag. Different sets of states are associated with different tags. Therefore, it is ultimately the tag that determines the configuration of the processing pipeline 230. For example, when a CROP operates in a multiple render target (MRT) mode, the change in the MRT mode, which requires a change in configuration of the processing pipeline 230, is communicated using tags. In the case where there are 8 MRT modes, 8 unique tags are assigned, one for each of the 8 MRT modes, and the state memory 222 stores a different set of states for each of the 8 unique tags.

The state pipeline 225 has a plurality of parallel data paths for the states. The number of parallel data paths is selected to be large enough to separately carry a sufficient number of unique states for configuring all of the stages of the processing pipeline 230. Generally, deeper and more complex processing pipelines require a larger number of unique states and thus more parallel data paths. However, when configuring any one stage of the processing pipeline 230, not all of unique states may be used. Each stage of the processing pipeline 230 has a predefined set of unique states that it uses for configuration. Typically, this predefined set includes less than all of the unique states that are carried by the state pipeline 225.

Figure 3:
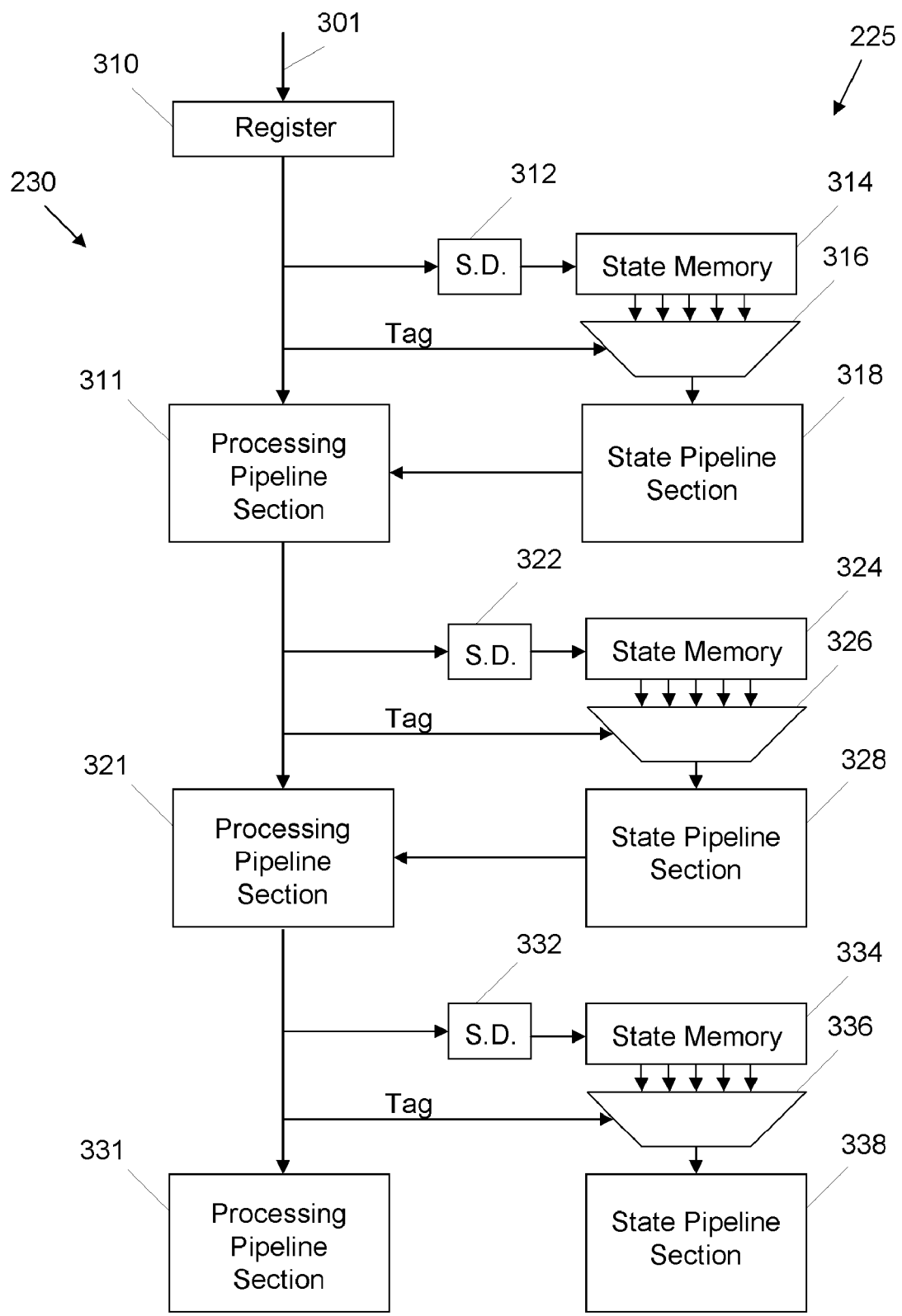
FIG. 3 is a block diagram of a processing unit having a processing pipeline and a state pipeline according to a second embodiment of the invention.

FIG. 3 is a block diagram of a processing unit having a processing pipeline 230 and a state pipeline 225 according to a second embodiment of the invention. In this embodiment, the processing pipeline 230 and the state pipeline 225 from FIG. 2 are divided into multiple sections. The number of sections may vary depending on the functions carried out by the processing pipeline 230. In this example, the number of sections is 3. Each stage in the processing pipeline sections 311, 321, 331 is configured in accordance with the states carried in a corresponding stage of the state pipeline sections 318, 328, 338, respectively. For example, stage 1 of the processing pipeline sections 311, 321, 331 is configured based on the states that are carried in stage 1 of the state pipeline sections 318, 328, 338, respectively, and stage 2 of the processing pipeline sections 311, 321, 331 is configured based on the states that are carried in stage 2 of the state pipeline sections 318, 328, 338, respectively, and so forth.

For each of the state pipeline sections 318, 328, 338, the set of states that are supplied to it is generated based on a tag and a state command that is received by a register 310 along with data 301 to be processed in the processing pipeline sections 311, 321, 331. The state command is detected by each of the state decoders 312, 322, 332. The state decoder 312 decodes the state command into states that are needed to configure the processing pipeline section 311, and these states are stored in state memory 314. The state decoder 322 decodes the state command into states that are needed to configure the processing pipeline section 321, and these states are stored in state memory 324. The state decoder 332 decodes the state command into states that are needed to configure the processing pipeline section 331, and these states are stored in state memory 334. Each of the selectors 316, 326, 336 is used to select a set of states stored in a corresponding one of the state memories 314, 324, 334, in accordance with the tag. The selected sets of states are then supplied to the state pipeline sections 318, 328, 338, respectively.

Because each of the processing pipeline sections 311, 321, 331 is not as deep as the processing pipeline 230, each of the state pipeline sections 318, 328, 338 associated with them has a smaller number of parallel data paths than the state pipeline 225. The number of parallel data paths of state pipeline section 318 is selected to be large enough to separately carry a sufficient number of unique states for configuring all of the stages of the processing pipeline section 311. The number of parallel data paths of state pipeline section 328 is selected to be large enough to separately carry a sufficient number of unique states for configuring all of the stages of the processing pipeline section 321. The number of parallel data paths of state pipeline section 338 is selected to be large enough to separately carry a sufficient number of unique states for configuring all of the stages of the processing pipeline section 331.

Figure 4:
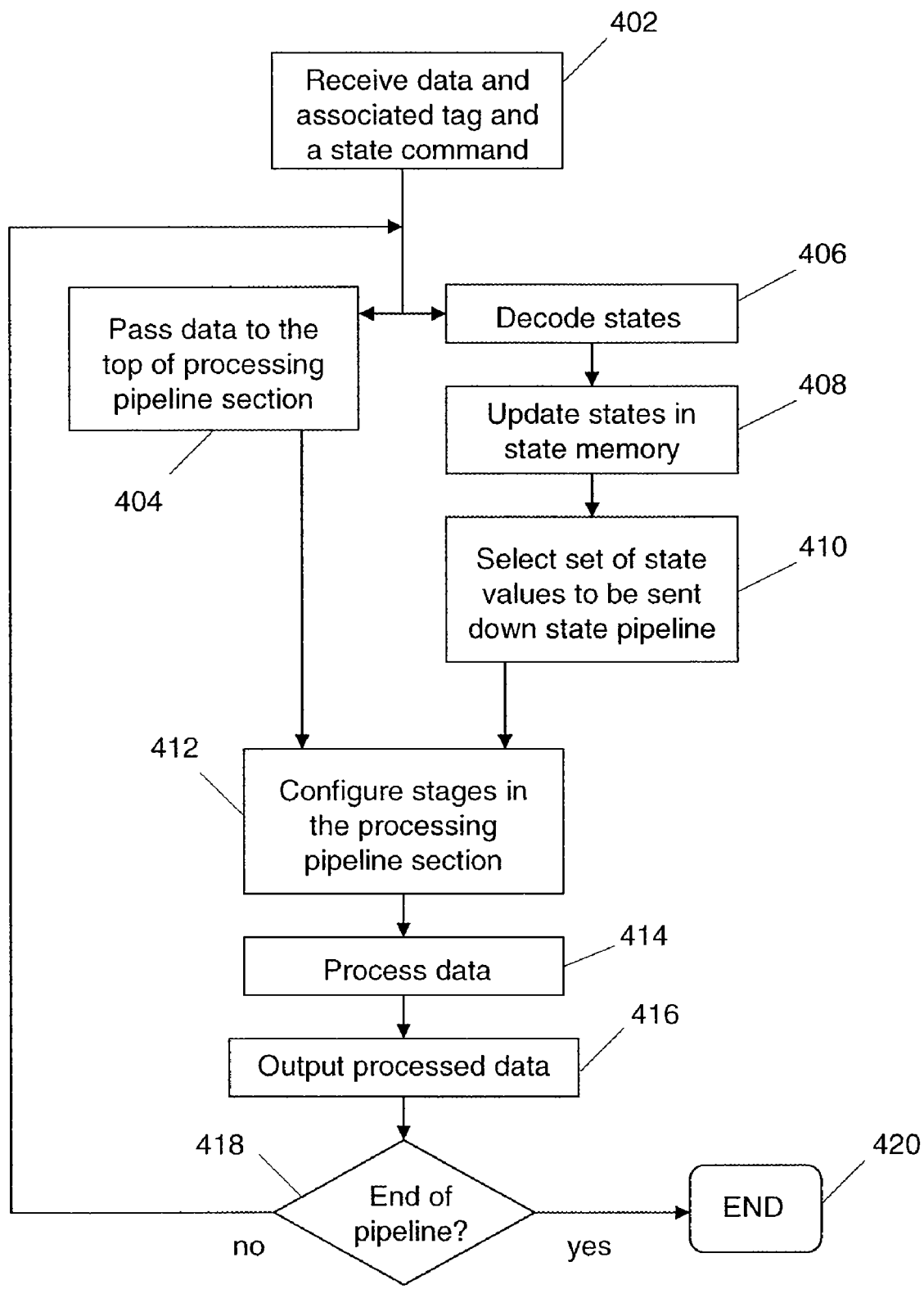
FIG. 4 is a flow diagram that illustrates the operation of a processing unit as shown in FIG. 3.

FIG. 4 is a flow diagram that illustrates the operation of a processing unit shown in FIG. 3. In step 402, the data to be processed in the processing pipeline sections are received, along with the state command, and the tag associated with the data. The data are passed to the top of a processing pipeline section in step 404, and the state command is decoded by the state decoder into states needed to configure the processing pipeline section in step 406. The states are then stored in the state memory (step 408). In step 410, a set of states from the state memory is selected based on the tag for transmission down a state pipeline section. Then, in step 412, each stage of the processing pipeline section is configured using the states carried by a corresponding stage of the state pipeline section. After the stages of the processing pipeline section are configured using the states carried in the state pipeline section, the stages of the processing pipeline section process the data (step 414). After processing, the data are output (step 416). In step 418, it is determined if the data output in step 416 have been processed by the last processing pipeline section. If the condition in step 418 is true, the process ends (step 420). If the condition in step 418 is false, steps 404, 406, 408, 410, 412, 414, 416 and 418 are repeated, beginning with the data being passed to the top of the next processing pipeline section (step 404) and the state command being decoded into states that are needed to configure the next processing pipeline section (step 406).

Figure 5:
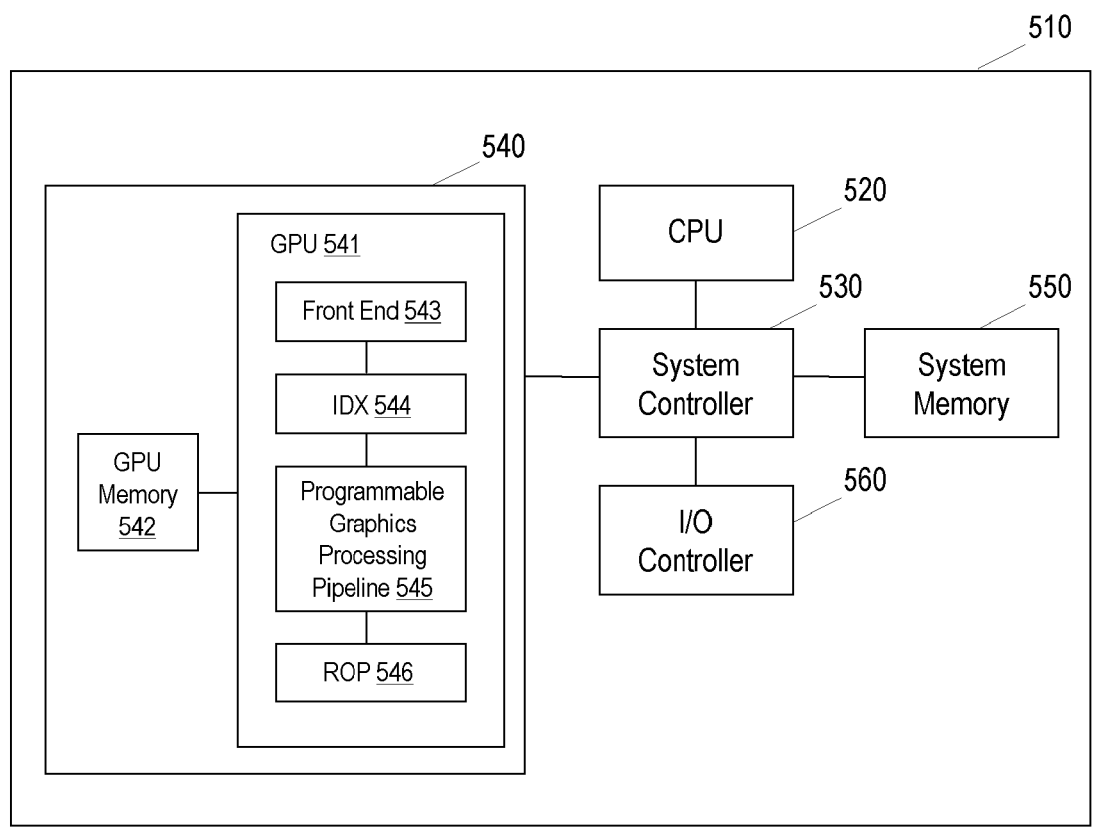
FIG. 5 illustrates a computing device in which embodiments of the present invention can be practiced.

FIG. 5 illustrates a computing device 510 in which embodiments of the present invention can be practiced. The computing device 510 includes a central processing unit (CPU) 520, a system controller hub 530 (sometimes referred to as a "northbridge"), a graphics subsystem 540, a main memory 550, and an input/output (I/O) controller hub 560 (sometimes referred to as a "southbridge") which is interfaced with a plurality of I/O devices (not shown), such as a network interface device, disk drives, USB devices, etc.

The graphics subsystem 540 includes a GPU 541 and a GPU memory 542. GPU 541 includes, among other components, front end 543 that receives commands from the CPU 520 through the system controller hub 530. Front end 543 interprets and formats the commands and outputs the formatted commands and data to an IDX (Index Processor) 544. Some of the formatted commands are used by programmable graphics processing pipeline 545 to initiate processing of data by providing the location of program instructions or graphics data stored in memory, which may be GPU memory 542, system memory 550, or both. Results of programmable graphics processing pipeline 545 are passed to a raster operations unit (ROP) 546, which performs near and far plane clipping and raster operations, such as stencil, z test, and the like, and saves the results or the samples output by programmable graphics processing pipeline 545 in a render target, e.g., a frame buffer.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

What is claimed is:

1. A graphics processing unit comprising:
   a processing pipeline having multiple sections, wherein each section has multiple stages, and each stage is configured in accordance with various states;
   a first memory unit for receiving data to be processed in the processing pipeline along with a tag that specifies a configuration of the processing pipeline associated with the data and a state command; and
   a state pipeline having multiple sections, wherein each section of the state pipeline has multiple stages, the state pipeline further including:
      a plurality of state decoders, wherein each state decoder corresponds to a different one of the sections of the state pipeline and is configured to receive the state command and to decode the state command into states that specify a configuration of the stages of the corresponding section of the processing pipeline,
      a plurality of second memory units, wherein each second memory unit corresponds to a different one of the sections of the state pipeline and is configured to store sets of states, including states specified by the state command, wherein a set of states is related to the tag and the data being processed in the processing pipeline, and
      a plurality of selectors, wherein each selector corresponds to a different one of the sections of the state pipeline and is configured to use the tag to select one of the sets of states that is stored in the corresponding second memory unit and transmit the selected set of states to the stages of the corresponding section of the state pipeline.

2. The graphics processing unit according to claim 1, wherein the number of stages of the processing pipeline is equal to the number of stages of the state pipeline.

3. The graphics processing unit according to claim 1, wherein the number of processing pipeline sections is equal to the number of state pipeline sections, and the number of stages in any one of the processing pipeline sections is equal to the number of stages in a corresponding state pipeline section.

4. The graphics processing unit according to claim 3, wherein the number of unique states transmitted through the state pipeline is X, and the number of unique states transmitted through each of the state pipeline sections is less than or equal to Y, where Y is less than X.

5. The graphics processing unit of claim 1, wherein a first tag corresponds to a first set of states that configures the processing pipeline to operate in a multiple render target mode.

6. The graphics processing unit of claim 1, wherein each of the second memory units stores eight sets of states, each one of the eight sets of states corresponding to a different multiple render target mode configuration of the processing pipeline and assigned to a different tag.

7. A computing device comprising:
   a memory unit for storing graphics data; and
   a processing unit that processes graphics data in accordance with program instructions, wherein the processing unit includes:
      a first pipeline for processing graphics data through multiple sections, wherein each section has multiple stages, and each stage is configured in accordance with various states,
      a first memory unit for receiving graphics data to be processed in the first pipeline along with a tag that specifies a configuration of the first pipeline associated with the received graphics data and a state command, and
      a second pipeline having multiple sections, wherein each section of the second pipeline has multiple stages and the number of sections of the second pipeline is equal to the number of sections of the first pipeline, the second pipeline further including:
         a plurality of state decoders, wherein each state decoder corresponds to a different one of the sections of the second pipeline and is configured to receive the state command and to decode the state command into states that specify a configuration of the corresponding section of the first pipeline,
         a plurality of second memory units, wherein each second memory unit corresponds to a different one of the sections of the second pipeline and is configured to store sets of states, including states specified by the state command, wherein a set of states is related to the tag and the data being processed in the first pipeline, and
         a plurality of selectors, wherein each selector corresponds to a different one of the sections of the second pipeline and is configured to use the tag to select one set of states that is stored in the corresponding second memory unit and transmit the selected set of states to the stages of the corresponding section of the second pipeline.

8. The computing device according to claim 7, wherein the number of first pipeline sections is equal to the number of second pipeline sections, and the number of stages in any one of the first pipeline sections is equal to the number of stages in a corresponding second pipeline section.

9. The computing device according to claim 8, wherein the number of unique states transmitted through the second pipeline is X, and the number of data paths for each of the second pipeline sections is less than or equal to Y, where Y is less than X.

10. The computing device of claim 7, wherein a first tag corresponds to a first set of states that configures the first pipeline to operate in a multiple render target mode.

11. The computing device of claim 7, wherein each of the second memory units stores eight sets of states, each one of the eight sets of states corresponding to a different multiple render target mode configuration of the first pipeline and assigned to a different tag.

12. In a processing unit having a processing pipeline that includes multiple sections, wherein each section has multiple stages, and a state pipeline that includes multiple sections, wherein each section of the state pipeline has multiple stages, the processing pipeline and the state pipeline being arranged in parallel, a method of configuring the processing pipeline using states stored in the state pipeline, said method comprising the steps of:
   receiving graphics data at the processing pipeline along with a tag that specifies a configuration of the processing pipeline associated with the graphics data and a state command;
   transmitting the graphics data through the multiple sections of the processing pipeline to produce transmitted graphics data;
   receiving the state command at state decoders in the state pipeline, wherein each state decoder corresponds to a different one of the sections of the state pipeline;

decoding the state command by one of the state decoders to obtain the states that are needed to configure the processing pipeline;

storing the states in a memory of a corresponding section of the state pipeline, wherein the memory is configured to store sets of states, including the states specified by the state command;

receiving the tag that specifies a configuration of the processing pipeline at selectors in the state pipeline, wherein each selector corresponds to a different one of the sections of the state pipeline and is configured to select one set of states from the memory of the corresponding section of the state pipeline;

selecting one of the sets of states that is stored in the corresponding memory using the tag to produce a selected set of states;

transmitting the selected set of states to the multiple stages of the corresponding section of the state pipeline; and configuring each stage of the processing pipeline based on the selected set of states, wherein the selected set of states includes the states specified by the state command.

13. The method according to claim 12, wherein the number of unique states transmitted through the state pipeline is X, and the number of unique states transmitted through each of the state pipeline sections is less than or equal to Y, where Y is less than X.

14. The method of claim 12, wherein a first tag corresponds to a first set of states that configures the processing pipeline to operate in a multiple render target mode.

15. The method of claim 12, wherein each of memory of a corresponding section of the state pipeline is configured to store eight sets of states, each one of the eight sets of states corresponding to a different multiple render target mode configuration of the processing pipeline and assigned to a different tag.

16. A graphics processing unit comprising:
a processing pipeline having multiple sections, wherein each section has multiple stages, and each stage is configured in accordance with various states;
a first memory unit for receiving data to be processed in the processing pipeline along with a tag that specifies a configuration of the processing pipeline associated with the data and a state command; and
a state pipeline having multiple sections, wherein each section of the state pipeline has multiple stages, the state pipeline further including:
a plurality of state decoders, wherein each state decoder corresponds to a different one of the sections of the state pipeline and is configured to receive the state command and to decode the state command into states that specify a configuration of the stages of the corresponding section of the processing pipeline, and
a plurality of second memory units, wherein each second memory unit corresponds to a different one of the sections of the state pipeline and is configured to store eight sets of states, including states specified by the state command and related to the data being processed in the processing pipeline, each one of the eight sets of states corresponding to a different multiple render target mode configuration of the processing pipeline and assigned to a different tag.

17. A computing device comprising:
a memory unit for storing graphics data; and
a processing unit that processes graphics data in accordance with program instructions, wherein the processing unit includes:
a first pipeline for processing graphics data through multiple sections, wherein each section has multiple stages, and each stage is configured in accordance with various states,
a first memory unit for receiving graphics data to be processed in the first pipeline along with a tag that specifies a configuration of the first pipeline associated with the received graphics data and a state command, and
a second pipeline having multiple sections, wherein each section of the second pipeline has multiple stages and the number of sections of the second pipeline is equal to the number of sections of the first pipeline, the second pipeline further including:
a plurality of state decoders, wherein each state decoder corresponds to a different one of the sections of the second pipeline and is configured to receive the state command and to decode the state command into states that specify a configuration of the corresponding section of the first pipeline, and
a plurality of second memory units, wherein each second memory unit corresponds to a different one of the sections of the second pipeline and is configured to store eight sets of states, including states specified by the state command, wherein a set of states is related to the tag and the data being processed in the first pipeline, each one of the eight sets of states corresponding to a different multiple render target mode configuration of the first pipeline and assigned to a different tag.

* * * * *